Oct. 22, 1929.   J. B. TIFFANY   1,732,781
APPARATUS FOR MAKING TUBULAR ARTICLES
Filed June 29, 1927
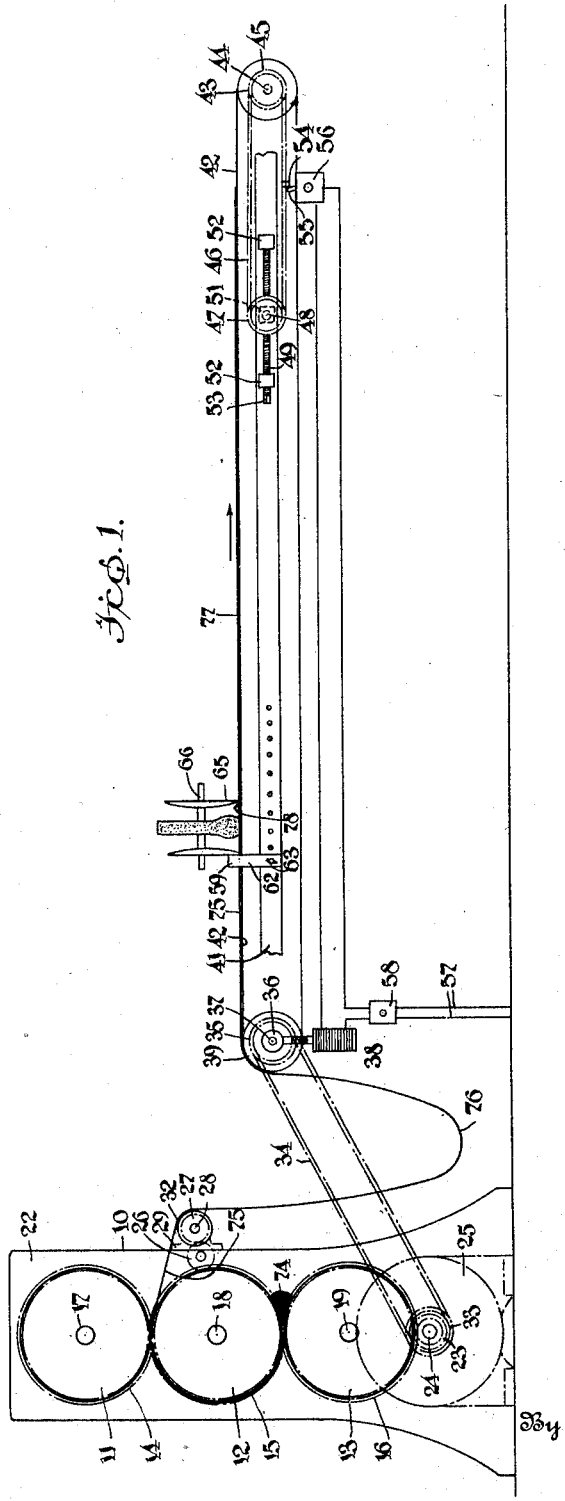
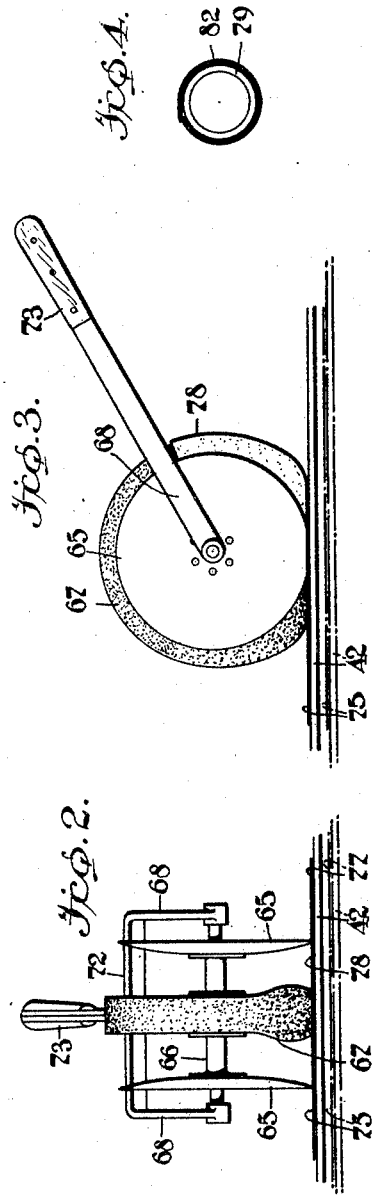
Inventor
John B. Tiffany,
Attorney Patented Oct. 22, 1929

1,732,781

UNITED STATES PATENT OFFICE

JOHN B. TIFFANY, OF AKRON, OHIO, ASSIGNOR TO THE GOODYEAR TIRE & RUBBER COMPANY, OF AKRON, OHIO, A CORPORATION OF OHIO

APPARATUS FOR MAKING TUBULAR ARTICLES

Application filed June 29, 1927. Serial No. 202,426.

My invention relates to an apparatus to be employed in manufacturing tubular articles and has particular relation to an apparatus of the above designated character which shall be especially applicable for manufacturing inner tubes for pneumatic tire casings.

One object of my invention is to provide an apparatus suitable for manufacturing inner tubes for pneumatic tire casings at a relatively low cost per unit.

Another object of my invention is to reduce the number of steps in the process of manufacturing inner tubes as heretofore practiced.

Another object of my invention is to provide an apparatus for manufacturing inner tubes that will require a reduced amount of floor space for its operation as compared with the floor space required for the proper manipulation of the apparatus heretofore employed.

Another object of my invention is to provide an apparatus for rolling blanks of inner tube stock upon mandrels at the calender where the stock is formed.

Prior to my invention, inner tube stock has been calendered and wound between the convolutions of a roll of fabric liner in which form it was transported to a tube rolling table. The roll was mounted on a horizontal shaft supported upon one end of the table and the stock so unwound from the roll as to extend across the table. A workman formed a tube rolling blank by dividing the stock with a hand stock cutting disc along a line at a predetermined distance from the end thereof. Thereafter the roll was rotated in a reverse direction in order to space the end of the material from the blank severed therefrom. During these operations the liner was rewound in the form of a roll upon an adjacent shaft mounted in parallel relation to the shaft of the supply roll. The blank of stock was then rolled upon a mandrel by the workman after which the unwinding and cutting operation was repeated.

According to my invention, a calender located adjacent a mill, not shown, is provided with plastic stock from which a continuous sheet is formed. The end of the sheet is adapted to be supported by an intermittently moving conveyor belt where the blank is severed into blanks that are rolled upon mandrels in the form of tubes.

For a better understanding of my invention, reference may now be had to the accompanying drawing, forming a part of this specification, of which:

Fig. 1 is a diagrammatical side elevational view of an apparatus for forming tubular articles, according to one embodiment of my invention;

Fig. 2 is a front elevational view of a severing device employed in connection with the operation of my apparatus;

Fig. 3 is a side elevational view of the device illustrated in Fig. 2; and,

Fig. 4 is an end view of a mandrel having a blank of stock rolled thereon to form a tubular article.

In practicing my invention I employ a calender 10 having rolls 11, 12 and 13 provided with intermeshing gears 14, 15 and 16 respectively. The rolls 11, 12 and 13 are rotatably mounted on shafts 17, 18 and 19 journaled at the opposite ends thereof in the vertically disposed parallel frame members 22. The gear 16 is adapted to mesh with a pinion 23 rigidly mounted on the end of a shaft 24 of a motor 25, which is positioned adjacent one of the frame members 22.

The gear 15 is adapted to mesh with a small gear 26 rotatably journaled in one of the frame members 22 and this gear operatively engages a second gear 27 rigidly mounted on the end of a shaft 28. The shaft 28 is rotatably mounted at its opposite ends in bearing blocks 29 rigidly secured to the frame members 22. A roll 32 is rigidly mounted on the shaft 28 intermediate the bearing blocks 29 and is adapted to rotate at a peripheral speed equal to the peripheral speed of the roll 12.

A sprocket wheel 33 is also rigidly mounted on the end of the shaft 24 of the motor 25 adjacent the gear 23 and is adapted to drive a chain 34 also operatively engaging a sprocket wheel 35. The sprocket wheel 35 is rigidly secured to the driving element of a clutch member 36, the sprocket wheel and the driving element being rotatably mounted on the end of a shaft 37. The shaft 37 is rotatably journaled adjacent its opposite ends between spaced frame members 41 of the apparatus. The driving element of the clutch 36 is non-rotatably mounted on the shaft 37, the driving and driven elements thereof being operatively controlled by a solenoid 38.

A roller 39, rigidly mounted on the shaft 37, is adapted to support one end of a conveyor belt 42, the opposite end of which is supported in like manner by a roller 43. The roller 43 is rigidly mounted on a shaft 44 also rotatably journalled at its opposite ends in the spaced frame members 41. A sprocket wheel 45 is rigidly mounted on the end of the shaft 44 beyond the adjacent frame member 41 and is adapted to drive a sprocket chain 46, which also operatively engages a sprocket wheel 47. The sprocket wheel 47 is rotatably mounted on a pin 48 which extends from a block 51 arranged in operative engagement with a threaded rod 49. The rod 49 is mounted for rotation adjacent its opposite ends in openings formed in spaced blocks 52 rigidly mounted on one of the frame members 41. One end of the rod 49 is provided with a square head 53 adapted to be engaged operatively by a suitable wrench when it is desirable to adjust the horizontal position of the sprocket wheel 47.

The sprocket chain 46 is provided with a lug 54 which is adapted to engage a pivoted arm 55 extending from within a control switch 56. The switch 56 is arranged in a series circuit with the coil of the solenoid 38, the power line 57 of the circuit being controlled by the operation of a double pole knife switch 58.

A bar 59 is adapted to extend transversely across and in spaced relation to the conveyor belt 42. The bar is supported at opposite ends with transversely extending portions 62 which are rigidly secured adjacent their lower ends to the frame members 41 by bolts 63.

The bar 59 is adapted to be engaged by the edge of one of a pair of spaced cutting discs 65 which are rigidly mounted adjacent their respective centers on a transversely extending rod 66. A disc 67, which may be formed of sponge rubber or other easily compressible material, is also mounted adjacent its axis on the rod 66 intermediate the discs 65. The diameter of the disc 67 is substantially greater than the equal diameters of the spaced cutting discs 65. The opposite ends of the rod 66 are rotatably journaled in openings formed in the ends of arms 68, the opposite ends of the arms being joined by a bar 72. The bar 72 supports a transversely extending handle 73, intermediate its ends.

In the operation of this embodiment of my invention, rubber compound material 74 is supplied between the rolls 12 and 13, which is adapted to be rolled into the form of a sheet of tube stock material 75. The tube stock material 75 extends from between the rolls 11 and 12, above the roll 32, and is suspended in the form of a loop 76 between the conveyor belt 42 and the roll 32. In order to form a blank 77 of the tube stock material 75, the lever 55 of the switch 56 is moved in a clockwise direction, which movement closes a circuit through the switch 56 and the coil of the solenoid 38. The solenoid 38 accordingly causes the driving and the driven elements of the clutch 36 to be engaged operatively, thereby effecting the rotation of the roll 39. The conveyor belt 42 and likewise the chain 46 is driven in the direction of the arrows shown on Fig. 1, thereby drawing the stock 75 from the loop 76 upon the conveyor belt 42.

When the chain 46 completes one revolution of movement, the lug 54 engages the lever 55, thus rotating it in a counterclockwise direction and opening the previously formed circuit through the switch 56. The coil of solenoid 38 again being de-energized the movement of the conveyor belt is discontinued. The handle 73 of the cutting device is then grasped by the workman and the disc 67 so compressed as to permit the discs 65 to engage the tube stock material 75. By rolling the discs 65 entirely across the strip of tube stock material 75, a transverse blank 78 is completely severed from the stock. As the disc 67 moves across the material, the blank 78 adheres thereto and is formed in a roll about the disc which is removed from the conveyor belt 42 with the cutting device. The blank 77, being then spaced from the end of the stock 75, a mandrel 79 is made to engage one edge thereof and according to the usual rolling operation, a tube 82 is formed upon the mandrel 79.

It is to be understood that the blank 77 may be severed at any predetermined length by adjusting the length of the chain 46, which may be provided with a plurality of removable links. By the proper manipulation of the threaded rod 49, the sprocket wheel 47 may be made to accommodate any desired length of the chain 46.

From the foregoing description, it is apparent that by the employment of my invention tubular articles of any description may be manufactured at a relatively rapid rate, and that expensive winding apparatus and trucks for transporting the rolls of the tube stock material from the calender to the rolling apparatus, are unnecessary. It is also possible by employing my invention to manufacture any given number of tubular articles with a substantial reduction in the floor space required for the apparatus and a similar reduction in the cost of labor heretofore required.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A tube rolling apparatus comprising a movable stock supporting table and means for severing the stock a predetermined distance from an end thereof comprising a pair of spaced cutting discs and a compressible disc of relatively greater diameter mounted to rotate with the first mentioned discs.

2. A cutting device comprising a pair of spaced discs mounted on a shaft, a compressible disc of a relatively greater diameter disposed on the shaft intermediate the spaced discs and means for rolling the spaced discs on a surface while compressing successive portions of the compressible disc.

Signed at Akron, in the county of Summit, and State of Ohio, this 27 day of June, 1927.

JOHN B. TIFFANY.